(12) United States Patent
Ito et al.

(10) Patent No.: US 6,700,860 B2
(45) Date of Patent: Mar. 2, 2004

(54) DEVICE FOR ADJUSTING TILT ANGLE OF OPTICAL PICKUP

(75) Inventors: Tatsuya Ito, Osaka (JP); Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 243 days.

(21) Appl. No.: 09/875,040

(22) Filed: Jun. 7, 2001

(65) Prior Publication Data

US 2001/0050899 A1 Dec. 13, 2001

(30) Foreign Application Priority Data

Jun. 13, 2000 (JP) ..................................... P2000-177073

(51) Int. Cl.[7] .............................................. G11B 17/00
(52) U.S. Cl. ...................................................... 369/253
(58) Field of Search ................................ 369/253, 219, 369/258, 263, 264, 266, 44.14, 44.15; 359/813, 823, 824, 822

(56) References Cited

U.S. PATENT DOCUMENTS 5,796,707 A * 8/1998 Kim ............................ 369/219
6,005,836 A * 12/1999 Choi ........................... 369/219
6,014,362 A * 1/2000 Park ............................ 369/258
6,369,963 B1 * 4/2002 Hotta et al. .................. 359/824
6,388,982 B2 * 5/2002 Ogusu ......................... 369/264

FOREIGN PATENT DOCUMENTS

| JP | 63-129524 | | 6/1988 |
| JP | 411039662 A | * | 2/1999 |
| JP | 11-273104 | | 10/1999 |

* cited by examiner

*Primary Examiner*—Allen Cao
(74) *Attorney, Agent, or Firm*—Morgan, Lewis & Bockius LLP (57) ABSTRACT

In a device for adjusting the tilt angle of an optical pickup by using a leaf spring and tilt-angle adjusting screws, an actuator 4 is mounted on and supported by a spherical seat 3 of an optical base 1. One portion of a base 7 of the actuator 4 is resiliently pressed by a leaf spring 30. Tilt-angle adjusting screws 10 and 11 are provided which are respectively screwed in two threaded holes 8 and 9 in the base 7. The direction of the resiliently pressing force imparted to the actuator 4 by the leaf spring 30 is tilted with respect to axes of the tilt-angle adjusting screws 10 and 11. By forming the leaf spring 30 into a substantially U-shaped configuration, the resiliently pressing force applied to the actuator 4 is made uniform.

7 Claims, 8 Drawing Sheets

PRIOR ART

FIG.13

PRIOR ART

DEVICE FOR ADJUSTING TILT ANGLE OF OPTICAL PICKUP

BACKGROUND OF THE INVENTION

1. Field of the Invention

The present invention relates to a device for adjusting the tilt angle of an optical pickup used for an optical recording and reproducing apparatus for effecting recording or reproduction with respect to a compact disk, an optical disk, or the like.

2. Description of the Related Art

Figure 13:
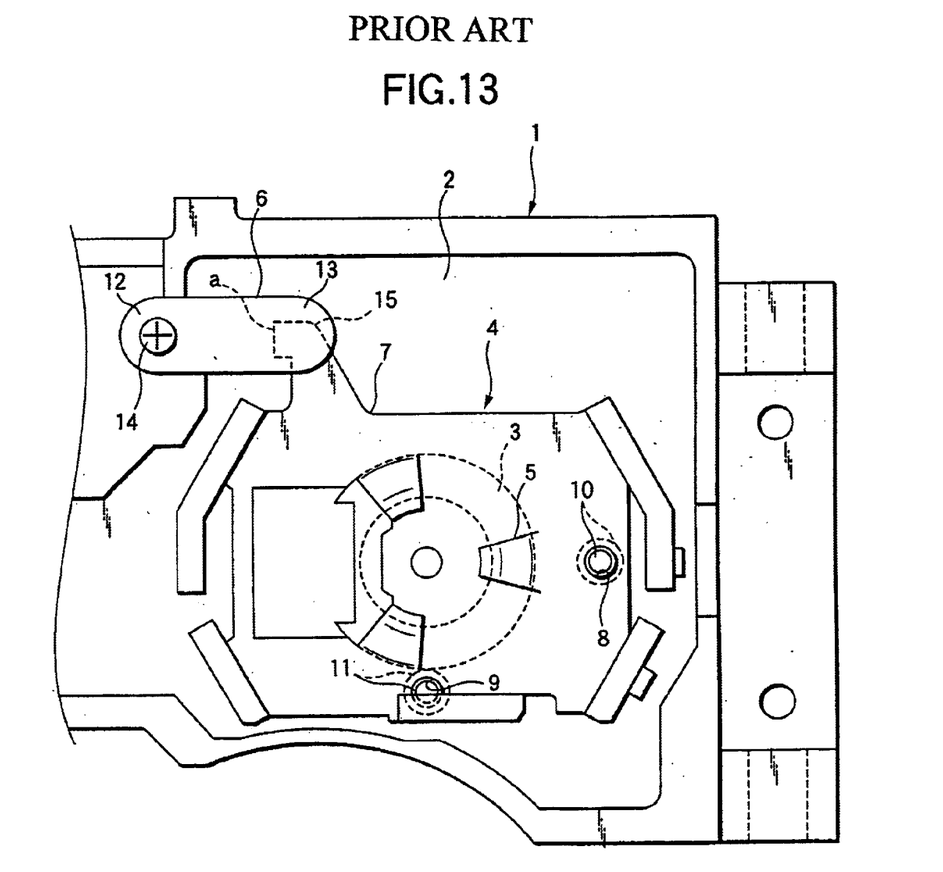
FIG. 13 is a schematic plan view of a conventional tilt-angle adjusting device.
Figure 14:
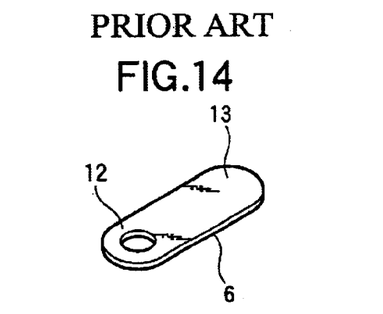
FIG. 14 is a perspective view of a leaf spring used in the conventional tilt-angle adjusting device.
Figure 15:
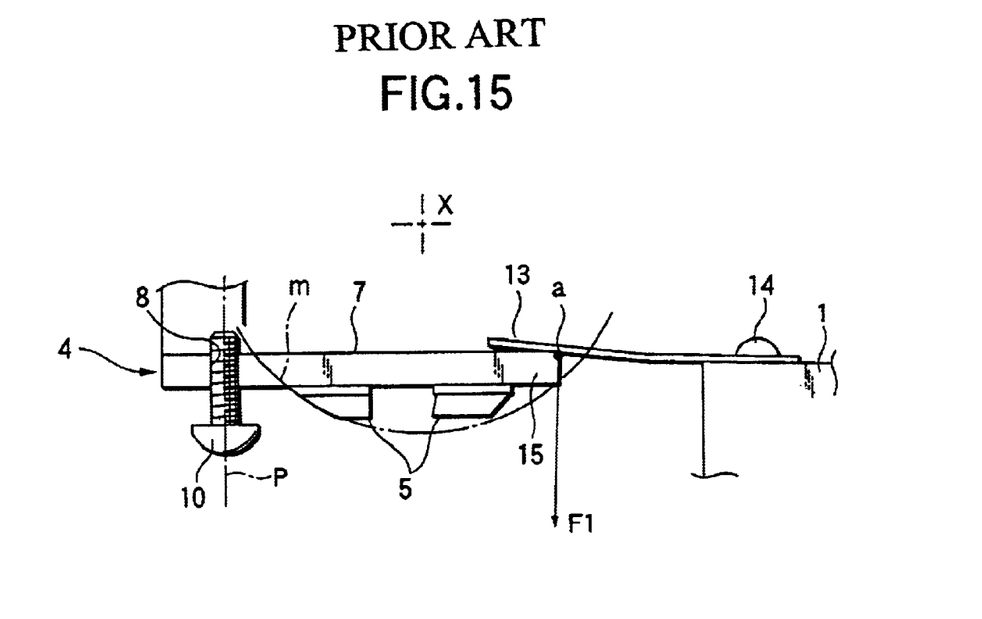
FIG. 15 is a diagram explaining the operation using the conventional tilt-angle adjusting device.

An optical pick up has the function of applying laser light upon a disk, and unless the direction of application of the laser light is adjusted appropriately, optical aberrations occur, so that drawbacks such as a decline in a signal level occurs. For this reason, a tilt-angle adjusting step for appropriately adjusting the direction of application of the laser light with high accuracy is included in the process of fabrication of the optical pickup. A conventional tilt-angle adjusting device for effecting the tilt-angle adjusting step is shown in FIG. 13, and the configuration of a leaf spring used in the tilt-angle adjusting device is shown in FIG. 14. Further, the operation based on the tilt-angle adjusting device is shown in FIG. 15.

In FIG. 13, reference numeral 1 denotes an optical base serving as a main base. A spherical seat 3 is provided on a bottom plat 2 of this optical base 1. Reference numeral 4 denotes an actuator on which a lens unit (not shown) for application of laser light is mounted, and the actuator 4 has supported portions 5. The supported portions 5 are mounted and supported on the spherical seat 3 of the optical base 1 in such a manner as to be tiltable about a center X (see FIG. 15) of the spherical seat 3. For this reason, the actuator 4 is tiltable about the center X.

A leaf spring 6 is screwed down in a predetermined position on the optical base 1. One portion of a base 7 of the actuator 4 is resiliently pressed by this leaf spring 6 at an eccentric position from the spherical seat 3, and the supported portions 5 of the actuator 4 are pressed against the spherical seat 3 by its resiliently pressing force. Meanwhile, threaded holes 8 and 9 are provided at two other portions of the base 7 of the actuator 4, and screwed into these threaded holes 8 and 9 are tilt-angle adjusting screws 10 and 11 inserted from the reverse side of the bottom plate 2 into screw insertion holes (not shown) provided in the bottom plate 2 of the optical base 1. In this state, the tilt-angle adjusting screws 10 and 11 are rotatably fitted at fixed positions on the optical base 1. Here, the portion a of the base 7 which is resiliently pressed by the leaf spring 6 is located at an eccentric position from the spherical seat 3. Similarly, the threaded holes 8 and 9 into which the tilt-angle adjusting screws 10 and 11 are screwed are also located at eccentric positions from the spherical seat 3, and the resiliently pressed portion a and the two threaded holes 8 and 9 are arranged in such a manner as to be distributed on both sides with the center X of the spherical seat 3 placed therebetween.

As shown in FIG. 14, the leaf spring 6 is formed by a single flat plate material having an attaching portion 12 and a resilient piece portion 13. As shown in FIG. 13, the attaching portion 12 is fixed to the optical base 1 by means of a screw 14 and, as shown in FIG. 15, the resilient piece portion 13 is in resilient contact with a receiving piece portion 15 provided on the base 7 in a state of being superposed on the receiving piece portion 15. For this reason, the direction of the resiliently pressing force applied to the receiving piece portion 15 of the actuator 4 by the leaf spring 6 has been substantially vertical as shown by arrow F1 in FIG. 1, i.e., substantially parallel to the axis P of the tilt-angle adjusting screw 10.

On the other hand, JP-A-11-273104 and JP-A-63-129524 give descriptions of optical pickups. Of these publications, JP-A-63-129524 proposes an optical pickup in which the tilt angle of the optical pickup is adjusted by making use of screws and a coil spring. In this optical pickup as well, the resiliently pressing force of the coil spring is parallel to the axial direction of the screw.

However, with the conventional tilt-angle adjusting device described with reference to FIGS. 13 to 15, it was found that when the actuator 4 is tilted by rotating the two tilt-angle adjusting screws 10 and 11 to effect the adjustment of the tilt angle of the optical pickup, since its adjustable range is narrow and the torque required for the tilt-angle adjusting screws 10 and 11 changes substantially depending on the amount of rotation, if the amount of rotation becomes large, the required torque becomes excessively large, and the tilt-angle adjusting screws 10 and 11 become difficult to rotate, with the result that it is difficult to ensure adjustment accuracy. On the other hand, if the amount of rotation is small, the required torque becomes excessively small, with the result that the adjustment sensitivity declines. Furthermore, it was found that since the resiliently pressing force applied to the receiving piece portion 15 of the actuator 4 by the leaf spring 6 is constituted by only a substantially downwardly oriented force, and the situation is such that practically no horizontal component is generated, the actuator 4 is likely to produce a horizontal positional offset.

SUMMARY OF THE INVENTION

The invention has been devised in view of the above-described circumstances, and its object is to provide a device for adjusting the tilt angle of an optical pickup by using a leaf spring and tilt-angle adjusting screws, which makes it possible to expand the adjustable range of the tilt angle, in which the torque required for rotating the tilt-angle adjusting screw ceases to change so much depending on the amount of rotation so as to make it possible to effect the adjustment of the tilt angle smoothly with high sensitivity, and in which the actuator is difficult to cause a horizontal positional offset, by allowing the resiliently pressing force imparted to the actuator by the leaf spring to generate a vertical component and a horizontal component.

The device for adjusting the tilt angle of an optical pickup includes: an optical base having a spherical seat; an actuator having supported portions supported by the spherical seat in such a manner as to be tiltable about a center of the spherical seat; a leaf spring for pressing the supported portions against the spherical seat by resiliently pressing a portion of a base of the actuator at an eccentric position from the spherical seat; and a tilt-angle adjusting screw fitted rotatably to a fixed position on the optical base and screwed down in a threaded hole at another portion of the base at an eccentric position from the spherical seat. Further, the direction of a resiliently pressing force applied to the actuator by the leaf spring is tilted with respect to an axis of the tilt-angle adjusting screw.

According to the above-described arrangement, the resiliently pressing force imparted to the actuator by the leaf spring generates a vertical component and a horizontal component. Accordingly, the adjustable range of the tilt angle expands, and the torque required for rotating the tilt-angle adjusting screw ceases to change so much depending on the amount of rotation to make it possible to effect the adjustment of the tilt angle smoothly with high sensitivity. Furthermore, the actuator is difficult to cause a horizontal positional offset.

Preferably, the leaf spring includes an attaching piece portion which is attached to the optical base, a resilient piece portion continuing from the attaching piece portion, and an applying portion which is provided in the resilient piece portion and is in resilient contact with the one portion of the base. As a specific example of such a leaf spring, it is possible to suitably use one having the following structure.

Namely, it is possible to suitably use a leaf spring in which the resilient piece portion has a projection extending diagonally upward from the attaching piece portion and a turned-back piece portion extending diagonally downward from a projecting end of the projection on a lower side of the projection through a U-shaped turning back portion, the applying portion being provided on the turned-back piece portion. In this case, the base may be formed in the shape of a flat plate, and the turned-back piece portion of the leaf spring may be tilted with respect to a plate surface of the base.

Further, it is preferred that the attaching piece portion of the leaf spring be screwed down to the optical base, and that a sliding piece portion which is substantially parallel to the plate surface of the base be provided continuing from a lower end of the turned-back piece portion. If this leaf spring is used, when the applying portion of the turned-back piece portion is brought into resilient contact with one portion of the base of the actuator, the sliding piece portion slides on the plate surface of the base and the applying portion of the turned-back piece portion is guided to one portion of the base. Therefore, a situation is difficult to occur in which the leaf spring is fitted on the optical base in a state in which a distal end of the turned-back piece portion remains abutting against the base.

Further, it is preferred that a projecting piece portion which can be clamped by a jig when the attaching piece portion is screwed down to the optical base be provided uprightly on the attaching piece portion. If this leaf spring is used, since the projecting piece portion can be clamped by a tweezers-like jig, and the attaching piece portion can be screwed down to the optical base, the operational efficiency further improves at the time when the leaf spring is fitted on the optical base.

In the invention, it is preferred that two threaded holes be provided as the threaded hole at circumferential portions of an outer periphery of the spherical seat, and that the distance between one of the threaded holes and a resiliently pressed portion of the base which is resiliently pressed by the leaf spring and the distance between another one of the threaded holes and the resiliently pressed portion are set to be identical or substantially identical. By adopting this arrangement, it becomes possible to accurately effect the adjustment of the tilt angle in the radial direction and the tangential direction by the two tilt-angle adjusting screws.

DETAILED DESCRIPTION OF THE PREFERRED EMBODIMENTS

Now, a description will be given in more detail of preferred embodiments of the invention with reference to the accompanying drawings.

Figure 1:
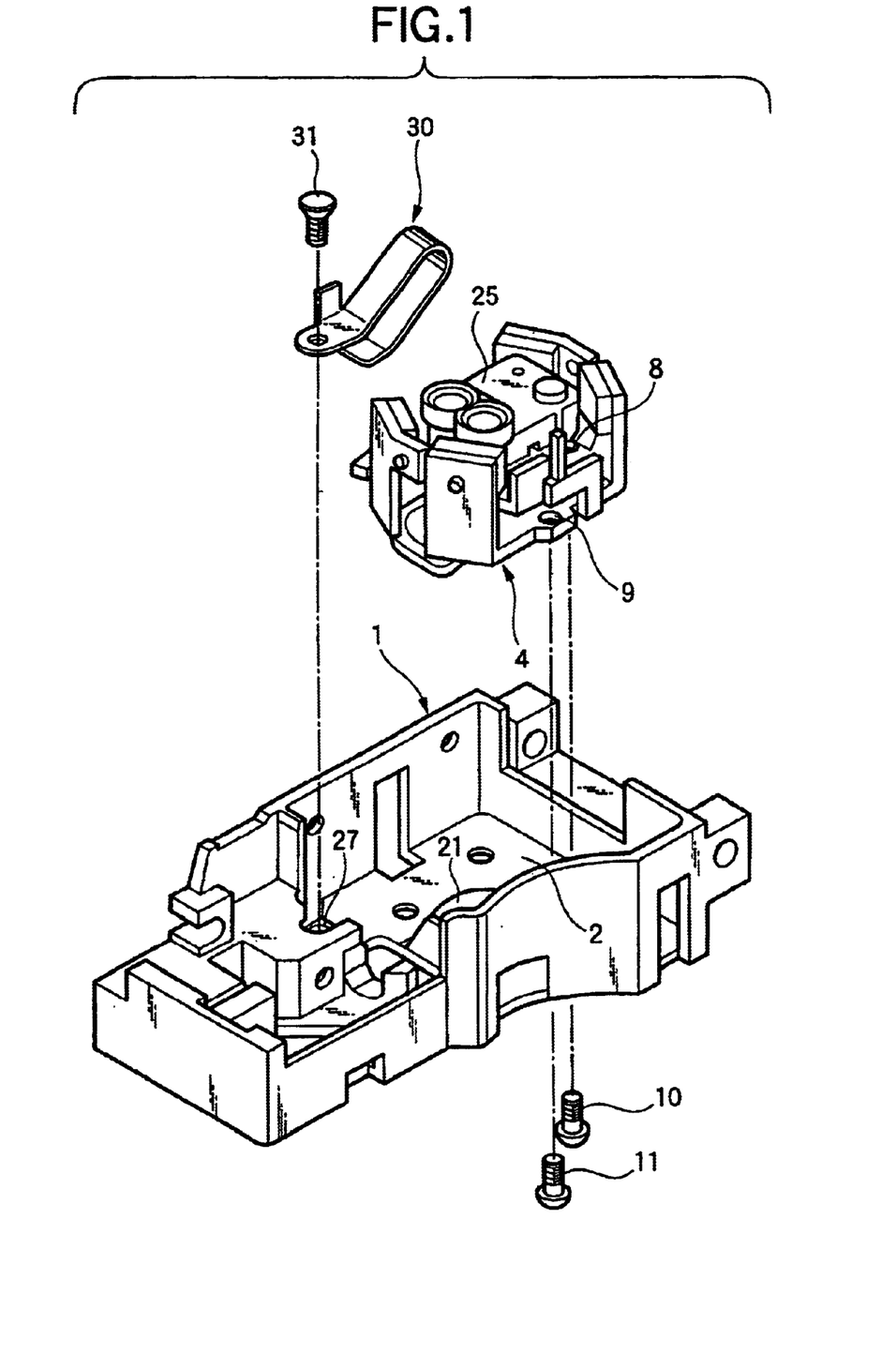
FIG. 1 is an exploded perspective view of an optical pickup in which a tilt-angle adjusting device in accordance with an embodiment of the invention is adopted.
Figure 2:
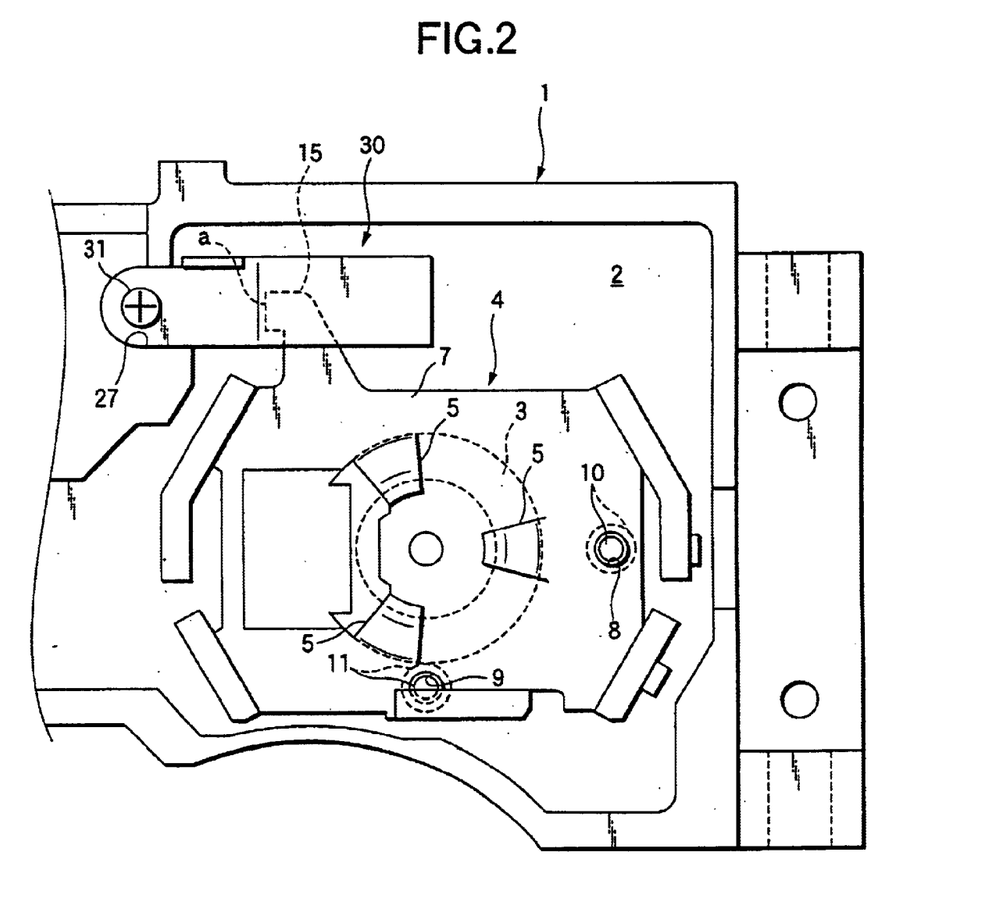
FIG. 2 is a schematic plan view of the tilt-angle adjusting device.
Figure 3:
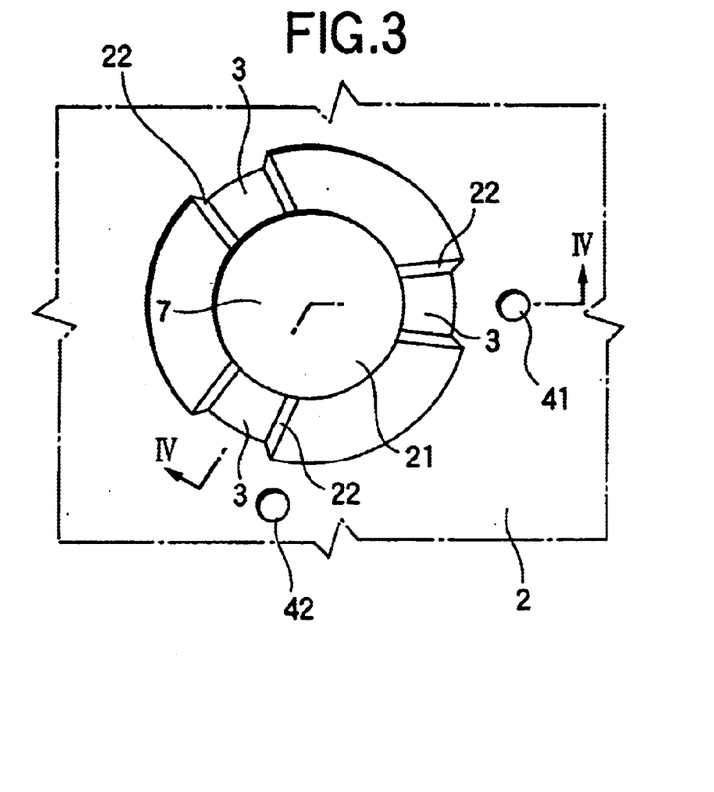
FIG. 3 is a plan view of a spherical seat.
Figure 4:
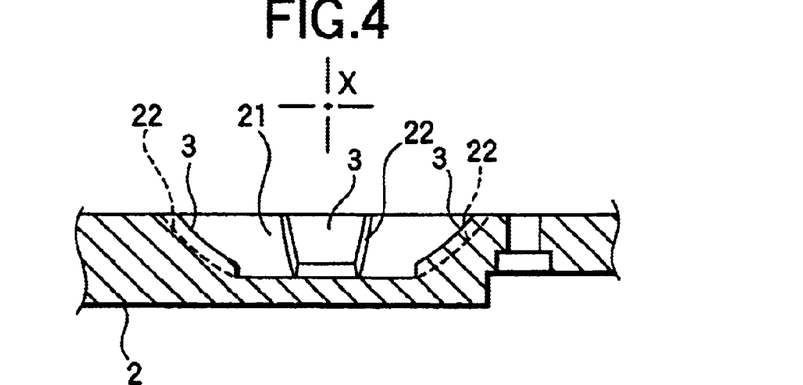
FIG. 4 is a cross-sectional view taken along line IV—IV in FIG. 3.
Figure 5:
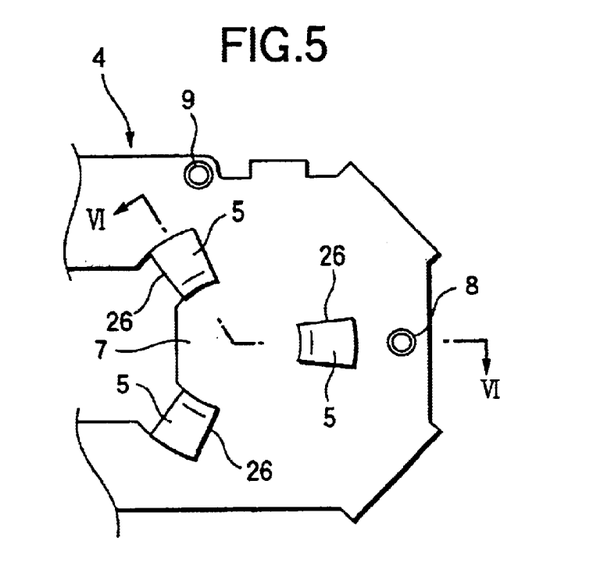
FIG. 5 is a plan view of supported portions.
Figure 6:
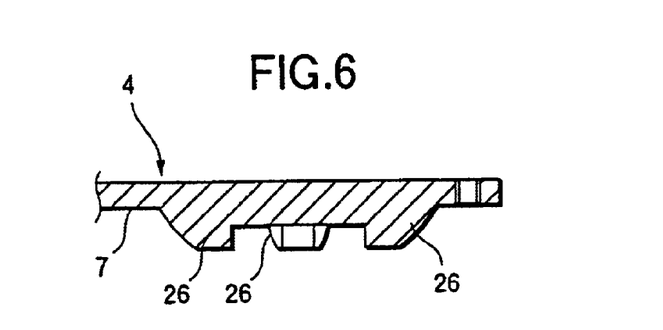
FIG. 6 is a cross-sectional view taken along line VI—VI IV in FIG. 5.
Figure 7:
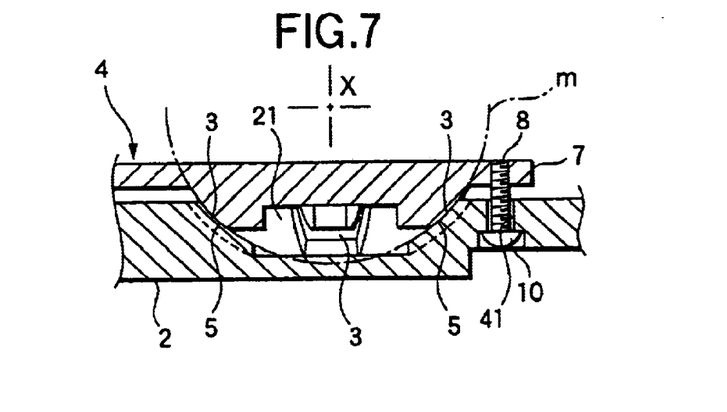
FIG. 7 is a cross-sectional view of a state in which the supported portions 5 are supported by the spherical seat 3.
Figure 8:
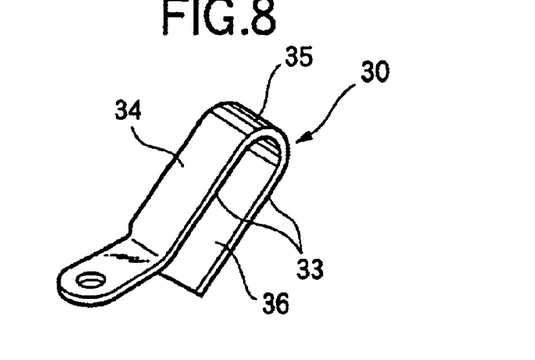
FIGS. 8 is a perspective view illustrating the configuration of a leaf spring.
Figure 9:
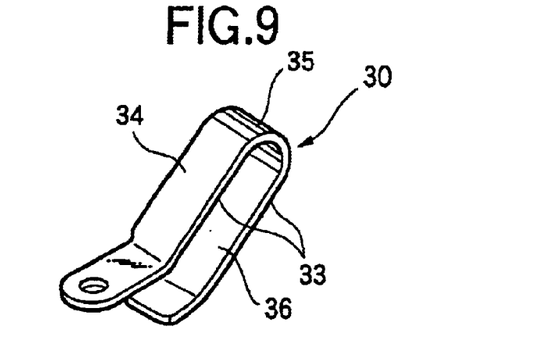
FIG. 9 is a perspective view illustrating the configuration of another leaf spring.
Figure 10:
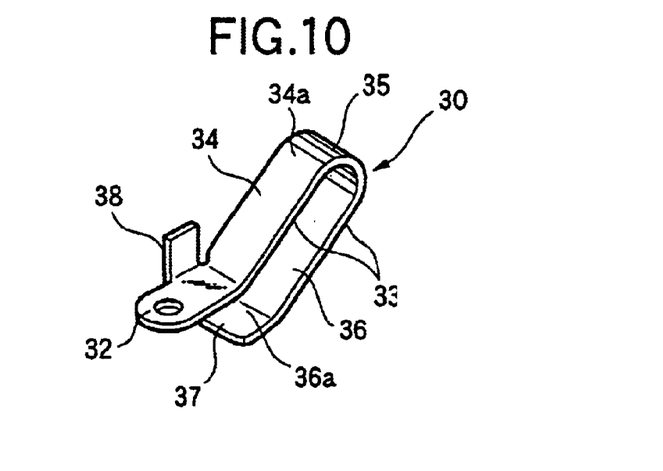
FIG. 10 is a perspective view illustrating the configuration of still another leaf spring.
Figure 11:
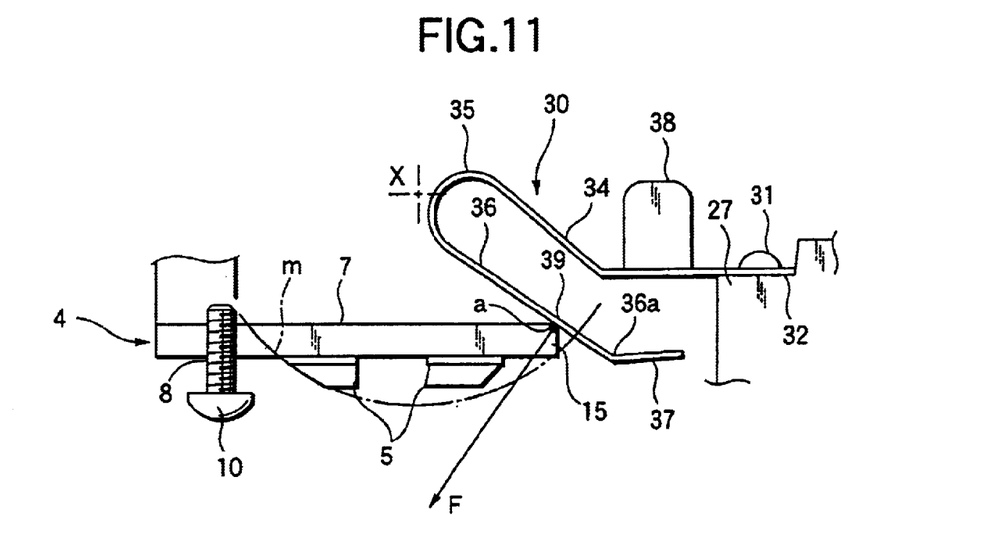
FIG. 11 is a diagram explaining the operation using the leaf spring shown in FIG. 10.
Figure 12:
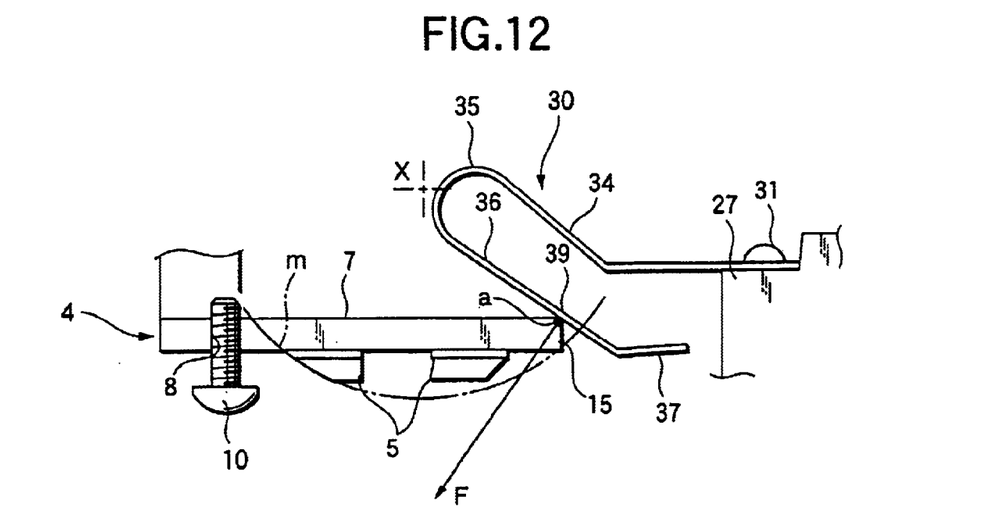
FIG. 12 is a diagram explaining the operation using the leaf spring shown in FIG. 9.

FIG. 1 is an exploded perspective view of an optical pickup in which a tilt-angle adjusting device in accordance with an embodiment of the invention is adopted; FIG. 2 is a schematic plan view of the tilt-angle adjusting device; FIG. 3 is a plan view of a spherical seat 3; FIG. 4 is a cross-sectional view taken along line IV—IV in FIG. 3; FIG. 5 is a plan view of supported portions 5; FIG. 6 is a cross-sectional view taken along line VI—VI in FIG. 5; FIG. 7 is a cross-sectional view of a state in which the supported portions 5 are supported by the spherical seat 3; FIGS. 8 to 10 are perspective views illustrating the configuration of a leaf spring 30; FIG. 11 is a diagram explaining the operation using the leaf spring 30 shown in FIG. 10; and FIG. 12 is a diagram explaining the operation using the leaf spring 30 shown in FIG. 9.

In this embodiment, since the matters other than the configuration of the leaf spring 30 and the relationship between the leaf spring 30 and the actuator are similar to those of the conventional tilt-angle adjusting device explained with reference to FIG. 13, identical portions will be denoted by identical reference numerals.

In FIG. 1, reference numeral 1 denotes an optical base serving as a main base. FIGS. 3 and 4 show the configuration and the structure of the spherical seat 3 provided on a bottom plate 2 of the optical base 1. The spherical seat 3 shown in FIGS. 3 and 4 is formed by projections 22 provided at three locations at equal angles on an outer peripheral portion of a recess 21 which is circular in a plan view and is formed on the bottom plate 2. The surfaces of the projections 22 are in contact with a common imaginary spherical surface (not shown) In FIG. 4, X denotes the center of the spherical seat 3.

In FIG. 1, reference numeral 4 denotes an actuator in a state in which a lens unit 25 for application of laser light is mounted thereon, and the supported portions 5 shown in FIGS. 5 and 6 are provided on its lower surface. The supported portions 5 are formed by downwardly cutting out three equiangular portions of a bottom plate portion of sheet metal forming the actuator 4. Namely, as shown in FIGS. 5 and 6, the supported portions 5 are formed by downward projections 26 provided at three equiangular locations, and the surfaces of the downward projections 26 are in contact with the common imaginary spherical surface (not shown). Further, as shown in FIG. 7, the supported portions 5 of the actuator 4 are mounted and supported on the spherical seat 3 provided on the bottom plate 2 of the optical base 1 in such a manner as to be tiltable about the center X (see FIG. 15) of the spherical seat 3. For this reason, the actuator 4 is tiltable about the center X. It should be noted that the contour of the aforementioned imaginary spherical surface is indicated by a chain line m in FIG. 7.

As shown in FIG. 1, the leaf spring 30 is screwed down to an attaching seat 27 provided on the optical base 1. Reference numeral 31 denotes a setscrew. This leaf spring 30 presses one portion of a plate-shaped base 7 of the actuator 4, specifically a receiving piece portion 15 of the actuator 4, at an eccentric position from the aforementioned spherical seat 3, and the supported portions 5 of the actuator 4 are pressed against the spherical seat 3 by its resiliently pressing force. Meanwhile, threaded holes 8 and 9 are provided at two other portions of the base 7 of the actuator 4, and screwed into these threaded holes 8 and 9 are tilt-angle adjusting screws 10 and 11 (see FIGS. 7 and 1) inserted from the reverse side of the bottom plate 2 into screw insertion holes 41 and 42 (see FIGS. 3 and 7) provided in the bottom plate 2 of the optical base 1. In this state, the tilt-angle adjusting screws 10 and 11 are rotatably fitted at fixed positions on the optical base 1. Here, as shown in FIG. 2, the portion a of the base 7 which is resiliently pressed by the leaf spring 30 is located at an eccentric position from the spherical seat 3. Similarly, the threaded holes 8 and 9 into which the tilt-angle adjusting screws 10 and 11 are screwed are also located at eccentric positions from the spherical seat 3, and the resiliently pressed portion a and the two threaded holes 8 and 9 are arranged in such a manner as to be distributed on both sides with the center X of the spherical seat 3 placed therebetween.

The leaf spring 30 adopted in the tilt-angle adjusting device shown in FIG. 1 is shown in FIG. 10 in enlarged form. As shown in the drawing, this leaf spring 30 has an attaching piece portion 32 which is attached to the optical base 1 and a resilient piece portion 33 continuing from the attaching piece portion 32. The resilient piece portion 33 includes a projection 34 extending diagonally upward from the attaching piece portion 32 and a turned-back piece portion 36 extending diagonally downward from a projecting end 34a of the projection 34 on the lower side of the projection 34 through a U-shaped turning back portion 35. In addition, a sliding piece portion 37 which is bent in a substantially horizontal direction is provided continuing from a lower end 36a of the turned-back piece portion 36. Further, a projecting piece portion 38, which can be clamped by a jig when the attaching piece portion 32 is screwed down to the optical base 1, is provided uprightly on the attaching piece portion 32.

As illustrated in FIG. 11 in an explanatory manner, in the leaf spring 30 screwed down to the attaching seat 27 of the optical base, the turned-back piece portion 36 is inclined at an angle close to 45 degrees with respect to the plate surface of the base 7, and one portion of the turned-back piece portion 36 is in resilient contact with a corner of the receiving piece portion 15. Accordingly, the corner of the receiving piece portion 15 conforms to the resiliently pressed portion a of the base 7 which is resiliently pressed by the leaf spring 30. Further, that portion of the turned-back piece portion 36 which is in contact with the corner of the receiving piece portion 15 functions as an applying portion 39.

If the turned-back piece portion 36 of the leaf spring 30 is inclined with respect to the plate surface of the base 7 and its applying portion 39 is in a state of being in resilient contact with the corner of the receiving piece portion 15, as shown in FIG. 11, the direction of the resiliently pressing force applied to the actuator 4 by the leaf spring 30 assumes a state of being inclined with respect to the axis of the tilt-angle adjusting screw 10 as indicated by arrow F. The relationship with the axis of the unillustrated other tilt-angle adjusting screw 11 is also similar. For this reason, the resiliently pressing force applied to the actuator 4 by the leaf spring 30 generates a vertical component and a horizontal component. Consequently, the actuator 4 is difficult to cause horizontal positional offset. Moreover, since the leaf spring 30 has the projection 34, the turning back portion 35, and the turned-back piece portion 36, a long effective creeping length (the creeping length from a proximal end of the projection 34 to the applying portion 39) of the leaf spring 30 can be secured, even if the leaf spring 30 is deflected by the tiling of the actuator 4 when the tilt-angle adjusting screws 10 and 11 are rotated, the resiliently pressing force with respect to the aforementioned resiliently pressed portion a does not change abruptly. For this reason, the torque required for rotating the tilt-angle adjusting screws 10 and 11 ceases to change so much depending on the amount of rotation, so that the adjustment of the tilt angle can be effected smoothly with high sensitivity, which contributes to the expansion of the adjustable range of the tilt angle.

Since the sliding piece portion 37, which is substantially parallel to the plate surface of the base 7, is provided continuing from the lower end of the turned-back piece portion 36 of the leaf spring 30 detailed with reference to FIG. 10, the following advantages are offered. Namely, when the attaching piece portion 32 of the leaf spring 30 is inserted into the optical base 1 from above the optical base 1 and is screwed down to the attaching seat 27, and the applying portion 39 of the turned-back piece portion 36 is brought into resilient contact with the corner of the receiving piece portion 15, the sliding piece portion 37 slides on the plate surface of the base 7 and the applying portion 39 of the turned-back piece portion 36 is guided to the corner of the receiving piece portion 15. Therefore, a situation is difficult to occur in which the leaf spring 30 is fitted on the optical base in a state in which the distal end (lower end 36a) of the turned-back piece portion 36 remains abutting against the base 7. For this reason, the operational efficiency improves. Furthermore, since the projecting piece portion 38 rising above the attaching piece portion 32 can be clamped by a tweezers-like jig, and the attaching piece portion 32 can be screwed down to the attaching seat 27 of the optical base 1, the operational efficiency further improves at the time when the leaf spring 30 is fitted on the optical base 1.

Although, in the above-described embodiment, the leaf spring 30 shown in FIG. 10 is used, the leaf spring 30 which does not have the projecting piece portion 38 may be used, as shown in FIG. 9. Further, it is possible to use the leaf spring 30 which does not have the projecting piece portion 38 and the sliding piece portion 37, as shown in FIG. 8. It should be noted that the operation based on the leaf spring 30 shown in FIG. 9 is shown in FIG. 12. Since this drawing corresponds to FIG. 11, and to avoid redundant explanation the identical portions are denoted by the same reference numerals, and a detailed description thereof will be omitted.

Next, in this embodiment, the two threaded holes 8 and 9 are provided at circumferential portions of the outer periphery of the spherical seat 3 in the base 7 of the actuator 4. The distance between the threaded hole 8 and the resiliently pressed portion a of the base which is resiliently pressed by the leaf spring 30 and the distance between the threaded holes 9 and the resiliently pressed portion a are set to be identical or substantially identical. By adopting this arrangement, it becomes possible to accurately effect the adjustment of the tilt angle in the radial direction and the tangential direction by the two tilt-angle adjusting screws 10 and 11.

It should be noted that after the tilt angle is adjusted by using the above-described tilt-angle adjusting device, the actuator 4 is fixed to the optical base 1 by an adhesive agent so that the actuator 4 does not move.

In accordance with the invention, in the tilt-angle adjusting device using the leaf spring and the tilt-angle adjusting screws, since the resiliently pressing force imparted to the actuator by the leaf spring generates a vertical component and a horizontal component, the torque required for rotating the tilt-angle adjusting screw ceases to change so much depending on the amount of rotation to make it possible to effect the adjustment of the tilt angle smoothly with high sensitivity. As a result, it becomes possible to expand the adjustable range of the tilt angle, the actuator becomes difficult to cause a horizontal positional offset, Particularly with the tilt-angle adjusting device using the leaf spring in accordance with claim 3 of the invention, since the resiliently pressing force of the leaf spring ceases to change abruptly by the tilting of the actuator, it becomes possible to effect the operation of rotating the tilt-angle adjusting screw smoothly with high sensitivity.

What is claimed is:

1. A device for adjusting the tilt angle of an optical pickup comprising:

an optical base having a spherical seat;

an actuator having supported portions supported by said spherical seat in such a manner as to be tiltable about a center of said spherical seat;

a leaf spring for pressing said supported portions against said spherical seat by resiliently pressing a portion of a base of said actuator at an eccentric position from said spherical seat; and a tilt-angle adjusting screw fitted rotatably to a fixed position on said optical base and screwed down in a threaded hole at another portion of said base at an eccentric position from said spherical seat;

wherein a direction of a resiliently pressing force applied to said actuator by said leaf spring is tilted with respect to an axis of said tilt-angle adjusting screw.

2. The device for adjusting the tilt angle of an optical pickup according to claim 1, wherein said leaf spring includes an attaching piece portion which is attached to said optical base, a resilient piece portion continuing from said attaching piece portion, and an applying portion which is provided in said resilient piece portion and is in resilient contact with the one portion of said base.

3. The device for adjusting the tilt angle of an optical pickup according to claim 2, wherein said resilient piece portion has a projection extending diagonally upward from said attaching piece portion and a turned-back piece portion extending diagonally downward from a projecting end of said projection on a lower side of said projection through a U-shaped turning back portion, said applying portion being provided on said turned-back piece portion.

4. The device for adjusting the tilt angle of an optical pickup according to claim 3, wherein said base is formed in the shape of a flat plate, and said turned-back piece portion of said leaf spring is tilted with respect to a plate surface of said base.

5. The device for adjusting the tilt angle of an optical pickup according to claim 4, wherein said attaching piece portion of said leaf spring is screwed down to said optical base, and a sliding piece portion which is substantially parallel to the plate surface of said base is provided continuing from a lower end of said turned-back piece portion.

6. The device for adjusting the tilt angle of an optical pickup according to claim 2, wherein a projecting piece portion which can be clamped by a jig when said attaching piece portion is screwed down to said optical base is provided uprightly on said attaching piece portion.

7. The device for adjusting the tilt angle of an optical pickup according to claim 1, wherein two threaded holes are provided as said threaded hole at circumferential portions of an outer periphery of said spherical seat, and a distance between one of said threaded holes and a resiliently pressed portion of the base which is resiliently pressed by said leaf spring and a distance between another one of said threaded holes and the resiliently pressed portion are set to be identical or substantially identical.

* * * * *